(12) United States Patent
Mehrotra et al.

(10) Patent No.: US 11,270,541 B2
(45) Date of Patent: Mar. 8, 2022

(54) METHOD AND SYSTEM FOR SECURE PRODUCT DELIVERY USING CRYPTOGRAPHY

(71) Applicant: MASTERCARD INTERNATIONAL INCORPORATED, Purchase, NY (US)

(72) Inventors: Vipul Mehrotra, Uttar Pradesh (IN); Ved Pratap Singh Chauhan, Uttar Pradesh (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/291,425

(22) Filed: Mar. 4, 2019

(65) Prior Publication Data

US 2020/0286315 A1  Sep. 10, 2020

(51) Int. Cl.
*G07C 9/00* (2020.01)
*H04L 9/32* (2006.01)
*G06Q 10/08* (2012.01)
*H04L 9/08* (2006.01)
*G06K 7/14* (2006.01)
*H04L 9/06* (2006.01)

(52) U.S. Cl.
CPC ....... *G07C 9/00912* (2013.01); *G06K 7/1404* (2013.01); *G06Q 10/0836* (2013.01); *H04L 9/0637* (2013.01); *H04L 9/0861* (2013.01); *H04L 9/3247* (2013.01)

(58) Field of Classification Search
CPC ............ G07C 9/00912; G07C 9/00896; H04L 9/3247; H04L 9/0637; H04L 2209/38; G06Q 10/0836
USPC .......................................................... 340/5.7
See application file for complete search history.

(56) References Cited

U.S. PATENT DOCUMENTS

| 10,097,353 | B1* | 10/2018 | Carlson | ............ H04W 12/0608 |
| 2002/0023213 | A1* | 2/2002 | Walker | ................ H04L 63/0442 713/168 |
| 2014/0068247 | A1* | 3/2014 | Davis | ....................... B60R 25/24 713/155 |
| 2015/0262137 | A1* | 9/2015 | Armstrong | .............. H04L 51/08 705/41 |
| 2015/0334108 | A1* | 11/2015 | Khalil | .................... H04W 12/06 726/8 |
| 2018/0047232 | A1* | 2/2018 | Sakumoto | .......... G07C 9/00309 |

(Continued)

*Primary Examiner* — Vernal U Brown
(74) *Attorney, Agent, or Firm* — Buchanan Ingersoll & Rooney PC

(57) ABSTRACT

A method for opening a secured lockbox through a digital signature includes: storing, in a memory of a computing device in a lockbox, a public key of a cryptographic key pair; receiving, by an input device of the computing device, a digital signature from an external communication device; validating, by a processing device of the computing device, the digital signature using the public key of the cryptographic key pair; and transmitting, by a transmitter of the computing device, a signal to an electronic locking mechanism of the lockbox interfaced with the computing device; and opening, by the electronic locking mechanism of the lockbox, an electronic lock granting access to contents of the lockbox upon receipt of the signal.

16 Claims, 6 Drawing Sheets

(56) References Cited

U.S. PATENT DOCUMENTS

2018/0167394 A1\* 6/2018 High ..................... H04L 9/3247
2019/0130387 A1\* 5/2019 Arora .................... H04L 9/3247

\* cited by examiner

METHOD AND SYSTEM FOR SECURE PRODUCT DELIVERY USING CRYPTOGRAPHY

FIELD

The present disclosure relates to product delivery using cryptography, specifically the use of a secured lockbox that can only be opened through a specific digital signature to protect the delivery of a product.

BACKGROUND

For hundreds of years, product delivery services have been used to ensure the successful delivery from a letter, package, or other product from one location to another. As technology and infrastructure have improved, delivery has changed from something that was initially often measured in weeks or months to now being accomplished in days, and sometimes in hours. As delivery services have improved, and as there are more ways than ever to connect senders and recipients to one another, the number of products being delivered is at an all-time high with billions of packages being exchanged every single day.

As more and more packages are being exchanged on a daily basis, there are more and more opportunities for delivery to be unsuccessful for one reason or another. For instance, the package may be tampered with, stolen, lost, replaced, or other subject to some other type of misfortune. In many cases, insurance may be purchased by a sender or recipient, or may be covered by the courier of the package, to offset any such incident. However, there are many instances where insurance can do little to fully compensate a recipient or sender following theft or loss of their package. For example, the recipient may have needed the product by a specific date, which may be impossible to fulfill following theft of the first package. In another example, the product being delivered may be one-of-a-kind, such as a custom, hand-made product that cannot be reproduced.

Some methods have been developed by couriers to provide for greater security in package delivery. For instance, the use of signatures to confirm proper receipt of a package helps ensure that the package is delivered to the correct recipient, and tracking numbers have assisted senders and recipients to know where a package is located and to identify any cases when a package may become lost or misplaced. However, these methods do little to protect the contents of the package itself from being stolen or replaced. Thus, there is a need for a system that can provide protection of the contents of a package, to ensure that only an authorized recipient can open the package to recover the contents.

SUMMARY

The present disclosure provides a description of systems and methods for opening a secured lockbox through a digital signature. The recipient of a product is provided with, or is otherwise in possession of, a private key of a cryptographic key pair. The product being delivered to the recipient is placed in a secured lockbox, which can only be opened with a digital signature that is generated using the private key. Thus, only the recipient or an entity authorized by the recipient will be able to release the lock on the lockbox to obtain the product stored therein. The digital signature is provided by the recipient (e.g., or authorized entity) upon delivery of the lockbox, which is then verified directly by the lockbox or by another system in communication therewith using the public key of the cryptographic key pair. Upon successful verification, the lock on the lockbox is released, enabling the recipient to obtain the product. At the same time, the courier can retain the lockbox for use in a future delivery, which has additional positive environmental impacts due to the reuse of the lockbox.

A method for opening a secured lockbox through a digital signature includes: storing, in a memory of a computing device in a lockbox, a public key of a cryptographic key pair; receiving, by an input device of the computing device, a digital signature from an external communication device; validating, by a processing device of the computing device, the digital signature using the public key of the cryptographic key pair; and transmitting, by a transmitter of the computing device, a signal to an electronic locking mechanism of the lockbox interfaced with the computing device; and opening, by the electronic locking mechanism of the lockbox, an electronic lock granting access to contents of the lockbox upon receipt of the signal.

Another method for opening a secured lockbox through a digital signature includes: receiving, by an input device of a computing device, in a lockbox a digital signature from an external communication device; transmitting, by a transmitter of the computing device, a data message including the digital signature to an external server; receiving, by a receiver of the computing device, a notification from the external server indicating successful validation of the digital signature; transmitting, by the transmitter of the computing device, a signal to an electronic locking mechanism of the lockbox interfaced with the computing device; and opening, by the electronic locking mechanism of the lockbox, an electronic lock granting access to contents of the lockbox upon receipt of the signal.

A system for opening a secured lockbox through a digital signature includes: a lockbox configured to store contents, the lockbox including an electronic lock operated by an electronic locking mechanism and a computing device interfaced with the electronic locking mechanism, wherein the computing device includes a memory configured to store a public key of a cryptographic key pair, an input device configured to receive a digital signature from an external communication device, a processing device configured to validate the digital signature using the public key of the cryptographic key pair, and a transmitter configured to transmit a signal to the electronic locking mechanism of the lockbox, and the electronic locking mechanism of the lockbox is configured to open the electronic lock granting access to the contents of the lockbox upon receipt of the signal.

Another system for opening a secured lockbox through a digital signature includes: a lockbox configured to store contents, the lockbox including an electronic lock operated by an electronic locking mechanism and a computing device interfaced with the electronic locking mechanism, wherein the computing device includes an input device of the computing device configured to receive a digital signature from an external communication device, a transmitter configured to transmit a data message including the digital signature to an external server, and a receiver configured to receive a notification from the external server indicating successful validation of the digital signature, wherein the transmitter is further configured to transmit a signal to an electronic locking mechanism of the lockbox interfaced with the computing device, and the electronic locking mechanism of the lockbox is configured to open the electronic lock granting access to the contents of the lockbox upon receipt of the signal.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Product Delivery Through a Secured Lockbox

Figure 1:
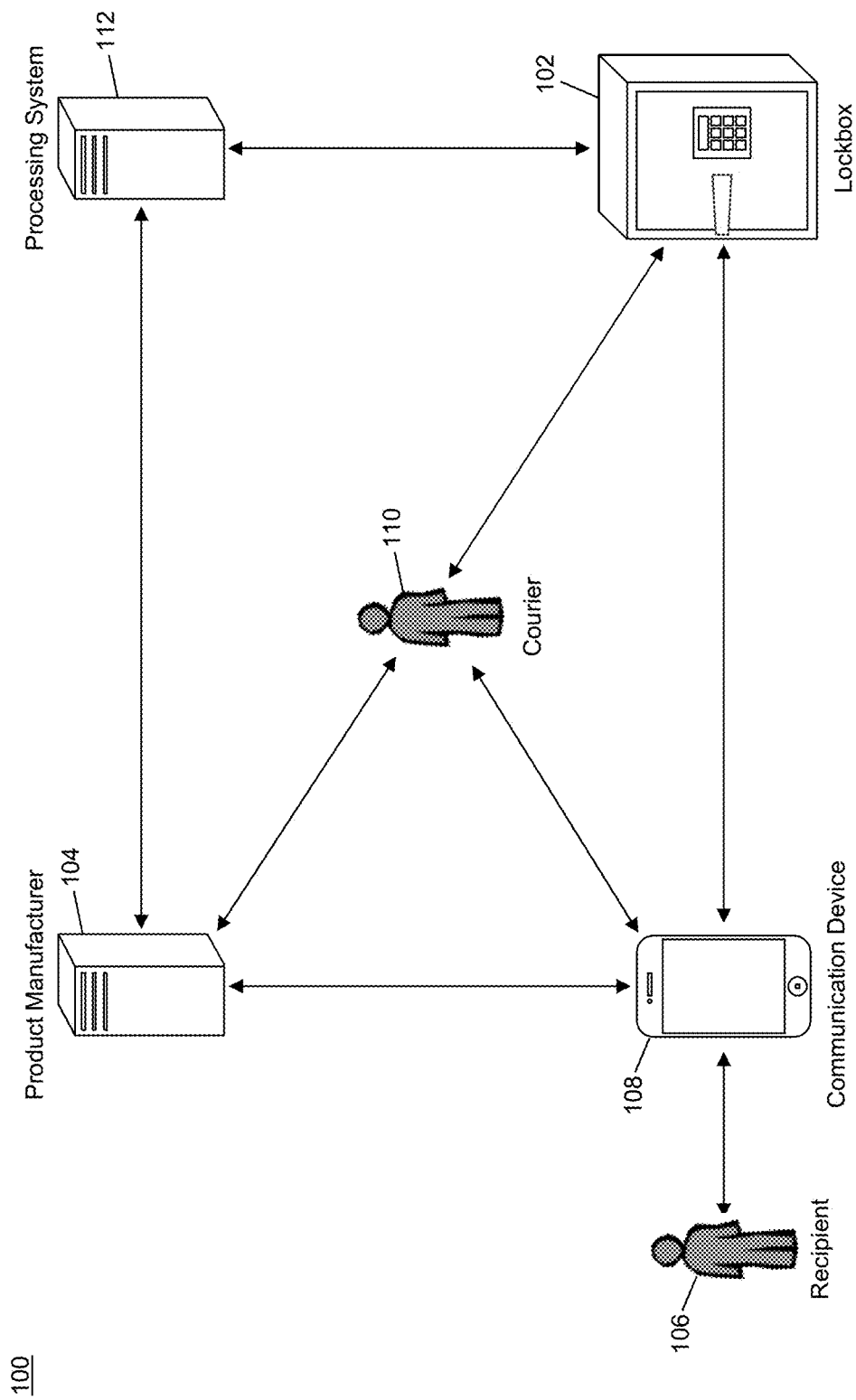
FIG. 1 is a block diagram illustrating a high level system architecture for delivery of a product via a secured lockbox opened through a digital signature in accordance with exemplary embodiments.

FIG. 1 illustrates a system 100 for the delivery of a product through the use of a secured lockbox that can only be opening via an appropriate digital signature, which can reduce theft and replacement of the product.

The system 100 may include a lockbox 102. The lockbox 102, discussed in more detail below, may be a physical container that is used to facilitate the delivery of a product from a product manufacturer 104 to a recipient 106. While exemplary embodiments discussed herein refer to a product manufacturer 104 as the sender of the product, it will be apparent to persons having skill in the relevant art that the methods and systems discussed herein may be applicable to any type of product delivery between any two types of entities, such as between businesses, individuals, merchants, retailers, manufacturers, resellers, etc. For instance, in one example, the recipient 106 may purchase the product from the product manufacturer 104. In another example, the recipient may be receiving a package being sent by their friend from another state or country.

The lockbox 102 may be configured such that it includes an electronic locking mechanism. The electronic locking mechanism may prevent opening of the physical container while locked, preventing any authorized party from gaining access to the product being stored therein. The lockbox 102 may be configured to keep the electronic locking mechanism closed unless a digital signature is provided and verified. In some cases, the electronic locking mechanism may be configured to be opened using an alternative method, such as a master key, passcode, or other suitable method. For example, the product manufacturer 104 may have its own method of opening the lockbox 102 when necessary in addition to the method that can be used by the recipient 106 to obtain their product, as discussed below.

In the system 100, the recipient 106 may purchase the product from the product manufacturer 104. As part of the purchase, the recipient 106 may be in possession or otherwise have access to a communication device 108. In some embodiments, the purchase may have been made using the communication device 108, such as through a website accessed by or via an application program executed by the communication device 108. The communication device 108 may be any type of device suitable for performing the actions discussed herein, such as a specially configured cellular phone, smart phone, smart watch, laptop computer, tablet computer, notebook computer, wearable computing device, implantable computing device, etc.

The communication device 108 may be in possession of a private key of a cryptographic key pair. In some embodiments, the communication device 108 may generate or otherwise identify the private key separate from the purchase of the product. In some cases, the communication device 108 may generate the cryptographic key pair, including the private key, as part of the purchasing process for the product. In these embodiments, a public key of the cryptographic key pair may be provided to the product manufacturer 104 during the purchasing process. For instance, the recipient 106 may, using the communication device 108, supply the product manufacturer 104 with the public key when providing shipping information for the product. In other embodiments, the product manufacturer 104 may generate or otherwise identify the cryptographic key pair including the private key and public key, and may electronically transmit the private key to the recipient's communication device 108. For instance, the product manufacturer 104 may transmit the private key to the communication device 108 along with a confirmation of the purchase or with shipping information.

The product manufacturer 104 may place the purchased product inside of the lockbox 102. The lockbox 102 may be provided to a courier 110, which may deliver the lockbox 102 to the recipient 106 using any suitable manner and method for physical delivery of the lockbox 102 to the recipient 106, such as to an address provided by the recipient 106 to the product manufacturer 104 (e.g., and from there to the courier 110) during the purchasing process. The courier 110 may deliver the lockbox 102 to the recipient 106, where the recipient 106 may use the communication device 108 to generate a digital signature for opening of the lockbox 102. The communication device 108 may generate a digital signature using the private key of the cryptographic key pair using any suitable signature generation algorithm. The digital signature may then be provided to the lockbox 102. In some embodiments, the communication device 108 may electronically transmit the digital signature to the lockbox 102, such as through a wireless transmission (e.g., via near field communication, Bluetooth, radio frequency, etc.) or the display of a machine-readable code that has the digital signature encoded therein that may be readable by the lockbox 102. In other embodiments, the digital signature may be manually entered into the lockbox 102, such as through an input device thereof, such as by the recipient 106 or the courier 110.

The lockbox 102 may receive the digital signature and may attempt to verify the digital signature. In one embodiment, the lockbox 102 itself may store a copy of the public key therein (e.g., provided by the product manufacture 104 following the purchasing process) and may attempt to verify the digital signature using the public key and the applicable signature algorithm. In another embodiment, the lockbox 102 may be in communication with a processing system 112.

The processing system 112 may be a computing system that is configured to perform verification of digital signatures using applicable public keys. In some cases, the processing system 112 may be part of the product manufacturer 104. In other cases, the processing system 112 may be a computing system associated with the courier 110. In such embodiments, the digital signature may be electronically transmitted by the lockbox 102 to the processing system 112 using any suitable communication method, and the processing system 112 may attempt the verification of the digital signature, where a result of the verification may be returned to the lockbox 102 using the suitable communication method.

The lockbox 102 may then react based on the result of the verification of the digital signature. If the verification is unsuccessful, then the lockbox 102 may prevent opening of the electronic locking mechanism. In some cases, the lockbox 102 may include a display device that may display a prompt or other message to the recipient 106 and/or courier 110 indicating that the verification was unsuccessful. In some instances, the recipient 106 may be provided with one or more opportunities to retry supply and/or verification of the digital signature. In some cases, the lockbox 102 may place a limit on the number of verification attempts, such as to prevent attempts at brute-forcing the verification. If the verification is successful, then the electronic locking mechanism may open, which may enable the recipient 106 to collect the product being stored in the physical container of the lockbox 102.

In some embodiments, the lockbox 102 may be disposable. In such embodiments, the lockbox 102 may be delivered to the recipient 106 by the courier 110 and may be left with the recipient 106. In such cases, the recipient 106 may be free to open the lockbox 102 out of presence of the courier 110. In other embodiments, the lockbox 102 may be reusable. In some such embodiments, the recipient 106 may open the lockbox 102 (e.g., using the digital signature) in the presence of the courier 110, where the courier 110 may retain the lockbox 102 to deliver back to the product manufacturer 104 or another entity for future use. In other such embodiments, the recipient 106 may open the lockbox 102 and may later return the lockbox 102 to the courier 110 for returning to the product manufacturer 104 or use in a future product delivery.

In some embodiments, a blockchain may be used for storage of digital signatures and conveyance to the lockbox 102 and/or the processing system 112. A blockchain may be a distributed storage mechanism that is stored in and managed by a plurality of nodes comprising a blockchain network. The blockchain network may be comprised of the plurality of nodes, where each node may be a computing system that is configured to perform functions related to the processing and management of the blockchain, including the generation of blockchain data values, verification of proposed blockchain submissions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

In such embodiments, a digital signature generated by the communication device 108 may be added to the blockchain in a new blockchain data value included therein using traditional methods and systems. The lockbox 102 or the processing system 112 may retrieve the digital signature from the blockchain for use in opening the electronic locking mechanism. In some cases, a blockchain may be used as an alternative communication mechanism for communicating the digital signature to the lockbox 102, such as in instances where the recipient 106 does not have a portable communication device or may be unable to otherwise present their communication device 108 when the lockbox 102 is to be opened. In some instances, blockchain may provide an added layer of security, as submissions made to the blockchain may themselves be checked and verified using traditional blockchain methods, such that the recipient 106 may be further verified by their blockchain submission, in addition to the check of the digital signature.

The methods and systems discussed herein provide for the secured delivery of a product from the product manufacturer 104 to the recipient 106 by a courier 110, where the courier 110 and any other unauthorized party cannot access the product through the use of a secured lockbox. By having an electronic locking mechanism prevent access to the product without presentation of the appropriate digital signature, the contents of the lockbox 102 may remain protected against all nefarious actors, as the electronic lock through a digital signature may be significantly more difficult to break than a traditional, physical lock. In addition, the use of a digital signature as opposed to a password, personal identification number, or other value ensures that there is no transmission that can be intercepted that would provide a nefarious actor with access to the stored product. For example, if the communication device 108 provides the public key to the product manufacturer 104 (e.g., and from there to the processing system 112 or lockbox 102), the private key is never available to any system or device apart from the communication device 108, ensuring that no other entity can generate a digital signature suitable for opening of the lockbox 102. Thus, use of the digital signature provides even greater security for delivery of the product to the recipient 106.

Lockbox

Figure 2:
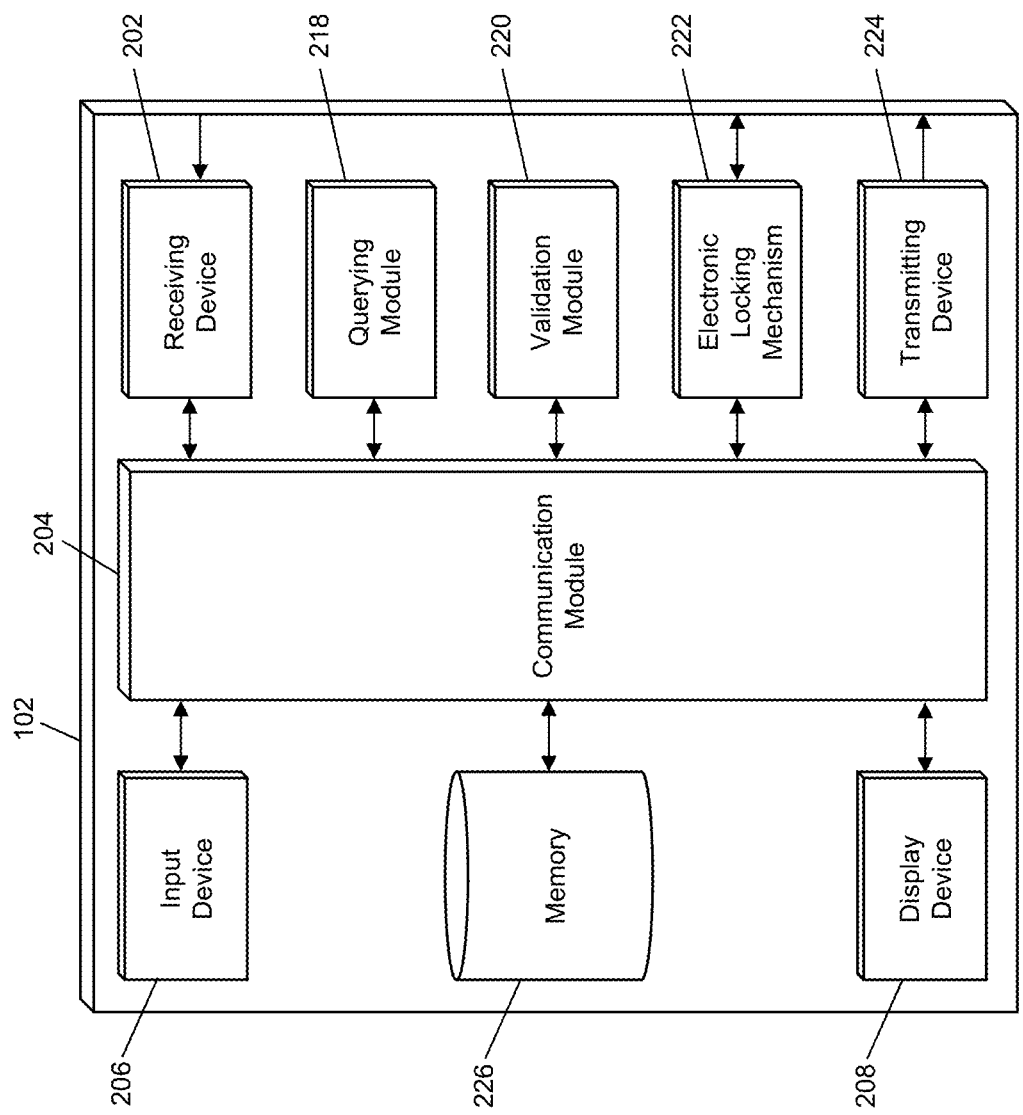
FIG. 2 is a block diagram illustrating the lockbox of the system of FIG. 1 for secure delivery of a product in accordance with exemplary embodiments.

FIG. 2 illustrates an embodiment of the lockbox 102 in the system 100. It will be apparent to persons having skill in the relevant art that the embodiment of the lockbox 102 illustrated in FIG. 2 is provided as illustration only and may not be exhaustive to all possible configurations of the lockbox 102 suitable for performing the functions as discussed herein. For example, the computer system 600 illustrated in FIG. 6 and discussed in more detail below may be a suitable configuration of the lockbox 102.

The lockbox 102 may include a receiving device 202. The receiving device 202 may be configured to receive data over one or more networks via one or more network protocols. In some instances, the receiving device 202 may be configured to receive data from product manufacturers 104, communication devices 108, processing systems 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by product manufacturers 104 that may be superimposed or otherwise encoded with a public key of a cryptographic key pair for use in verifying digital signatures. The receiving device 202 may also be configured to receive data signals electronically transmitted by processing systems 112, which may be superimposed or otherwise encoded with verification results for attempted verifications of digital signatures provided thereto by the lockbox 102. The receiving device 202 may also be configured to receive data signals that may be electronically transmitted by communication devices 108 that may be superimposed or otherwise encoded with digital signatures for verification.

The lockbox 102 may also include a communication module 204. The communication module 204 may be configured to transmit data between modules, engines, databases, memories, and other components of the lockbox 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the lockbox 102 and external components of the lockbox 102, such as externally connected databases, display devices, input devices, etc. The lockbox 102 may also include a processing device. The processing device may be configured to perform the functions of the lockbox 102 discussed herein as will be apparent to persons having skill in the relevant art. In some embodiments, the processing device may include and/or be comprised of a plurality of engines and/or modules specially configured to perform one or more functions of the processing device, such as a querying module 218, validation module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The lockbox 102 may also include or be otherwise interfaced with one or more input devices 206. The input devices 206 may be internal to the lockbox 102 or external to the lockbox 102 and connected thereto via one or more connections (e.g., wired or wireless) for the transmission of data to and/or from. The input devices 206 may be configured to receive input from a user of the lockbox 102 (e.g., the recipient 106, courier 110, etc.), which may be provided to another module or engine of the lockbox 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, read and decode a digital signature from a machine-readable code displayed by the communication device 108, or receive keyboard input of a digital signature by the recipient 106.

The lockbox 102 may also include or be otherwise interfaced with a display device 208. The display device 208 may be internal to the lockbox 102 or external to the lockbox 102 and connected thereto via one or more connections (e.g., wired or wireless) for the transmission of data to and/or from. The display device 208 may be configured to display data to a user of the lockbox 102 (e.g., the recipient 106, courier 110, etc.). The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the lockbox 102 may include multiple display devices 208. The display device 208 may be configured to, for example, display prompts to the recipient 106 regarding the results of the verification of a supplied digital signature.

The lockbox 102 may include a querying module 218. The querying module 218 may be configured to execute queries on databases to identify information. The querying module 218 may receive one or more data values or query strings, and may execute a query string based thereon on an indicated database, such as a memory 226 of the lockbox 102, to identify information stored therein. The querying module 218 may then output the identified information to an appropriate engine or module of the lockbox 102 as necessary. The querying module 218 may, for example, execute a query on the memory 226 of the lockbox 102 to identify a public key for use in performing verification of a digital signature.

The lockbox 102 may also include a validation module 220. The validation module 220 may be configured to perform validations and verifications for the lockbox 102 as part of the functions discussed herein. The validation module 220 may receive data to be validated or verified as input, may perform a verification or validation, and may output a result of the verification or validation to another module or engine of the lockbox 102. For example, the validation module 220 may be configured to verify a digital signature using a public key of a cryptographic key pair that includes the private key that is supposed to be used to generate the digital signature.

The lockbox 102 may also include an electronic locking mechanism 222. The electronic locking mechanism 222 may be a locking mechanism that operates using a combination of mechanical and electrical elements to lock a physical container as part of the lockbox 102. The electronic locking mechanism 222 may be configured to remain locked unless a successful verification of a digital signature (e.g., as performed by the validation module 220) occurs. In some embodiments, the electronic locking mechanism 222 may be configured to remain locked as a default status, such that the lock may be not be opened in the event that there is a disruption to a power source of the lockbox 102 or the electronic locking mechanism 222.

The lockbox 102 may also include a transmitting device 224. The transmitting device 224 may be configured to transmit data over one or more networks via one or more network protocols. In some instances, the transmitting device 224 may be configured to transmit data to product manufacturers 104, communication devices 108, processing systems 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to communication devices 108 that may be superimposed or otherwise encoded with requests for digital signatures and notifications regarding attempted verifications. The transmitting device 224 may also be configured to electronically transmit data signals to processing systems 112, which may be superimposed or otherwise encoded with digital signatures for verification thereby.

The lockbox 102 may also include a memory 226. The memory 226 may be configured to store data for use by the lockbox 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the lockbox 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, signature algorithms, public keys, shipping information, recipient identification data, etc.

Process for Secure Delivery of a Product Using a Digital Signature

Figure 3:
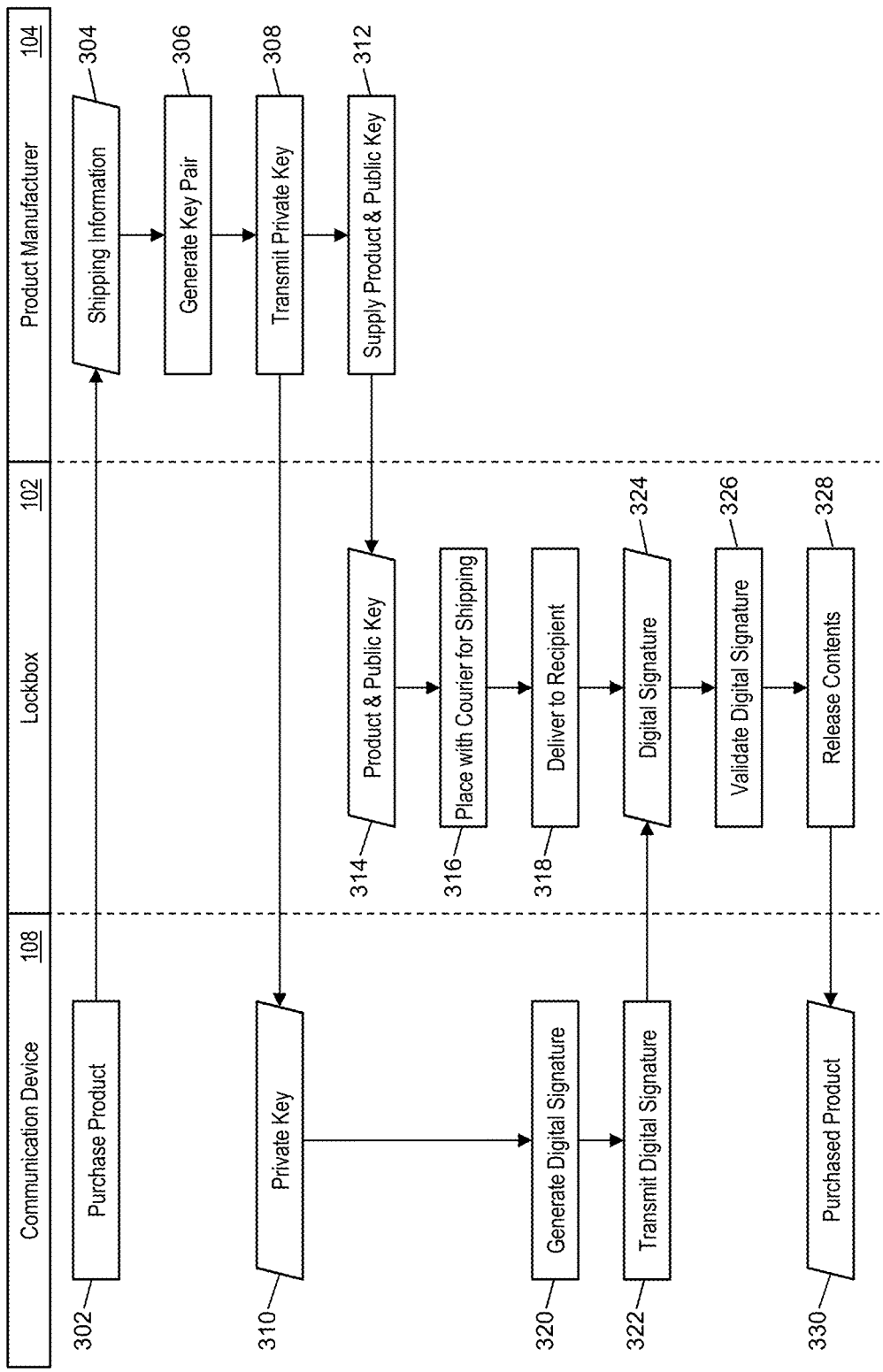
FIG. 3 is a flow diagram illustrating a process for the secure delivery of a product in the system of FIG. 1 through the use of the secure lockbox of FIG. 2 and digital signatures in accordance with exemplary embodiments.

FIG. 3 illustrates an example process for the secure delivery of a product from the product manufacturer 104 to the recipient 106 in the system 100 through the use of the lockbox 102 and a digital signature.

In step 302, the recipient 106 may purchase a product from the product manufacturer 104 using their communication device 108. As part of the purchase of the product, the recipient 106 may supply the product manufacturer 104 with shipping information, such as a shipping address to which the product is to be delivered. In step 304, the product manufacturer 104 may receive the shipping information, as well as payment, if applicable, for the product to be delivered. In step 306, the product manufacturer 104 may generate a cryptographic key pair comprised of a public key and a private key using any suitable key generation algorithm. In step 308, the product manufacturer 104 may electronically transmit the private key of the key pair to the communication device 108 using any suitable communication network and method, for receipt thereby, in step 310. In some embodiments, step 306 may be performed by the communication device 108, where steps 308 and 310 may be replaced by transmission of the public key from the communication device 108 to the product manufacturer 104 and receipt thereby.

In steps 312 and 314, the product manufacturer 104 may place the product(s) purchased by the recipient 106 in a physical container of the lockbox 102 that may be locked via the electronic locking mechanism 222. The public key may also be stored into the memory 226 of the lockbox 102, such that the electronic locking mechanism 222 may remain locked unless a digital signature is successfully verified using that public key. In some cases, the lockbox 102 may have an interface accessible by the product manufacturer 104 for supplying of the public key and subsequent locking. In other cases, the lockbox 102 may be configured to lock upon the receipt of a public key and may not unlock until successful verification of a digital signature occurs.

In step 316, the lockbox 102 may be placed with a courier 110 for shipping to the address provided by the recipient 106 to the product manufacturer 104 during the purchasing process. In step 318, the courier 110 may deliver the lockbox 102 to the recipient 106. As part of the delivery process, in step 320, the communication device 108 may generate a digital signature using the private key of the cryptographic key pair using a suitable signature generation algorithm. In step 322, the communication device 108 may electronically transmit the digital signature to the lockbox 102 using a suitable communication method. In step 324, the receiving device 202 or the input device 206 of the lockbox 102 may receive the digital signature.

In step 326, the validation module 220 of the lockbox 102 may validate the digital signature using the public key stored in the memory 226 thereof. After successful validation, in step 328 the electronic locking mechanism 222 of the lockbox 102 may open the electronic lock and give access to the product(s) stored in the container of the lockbox 102. In step 330, the recipient 106 as a user of the communication device 108 may retrieve the purchased product(s) from the lockbox 102. In some embodiments, the lockbox 102 may then be returned to the product manufacturer 104 or otherwise used in future product deliveries.

Figure 4:
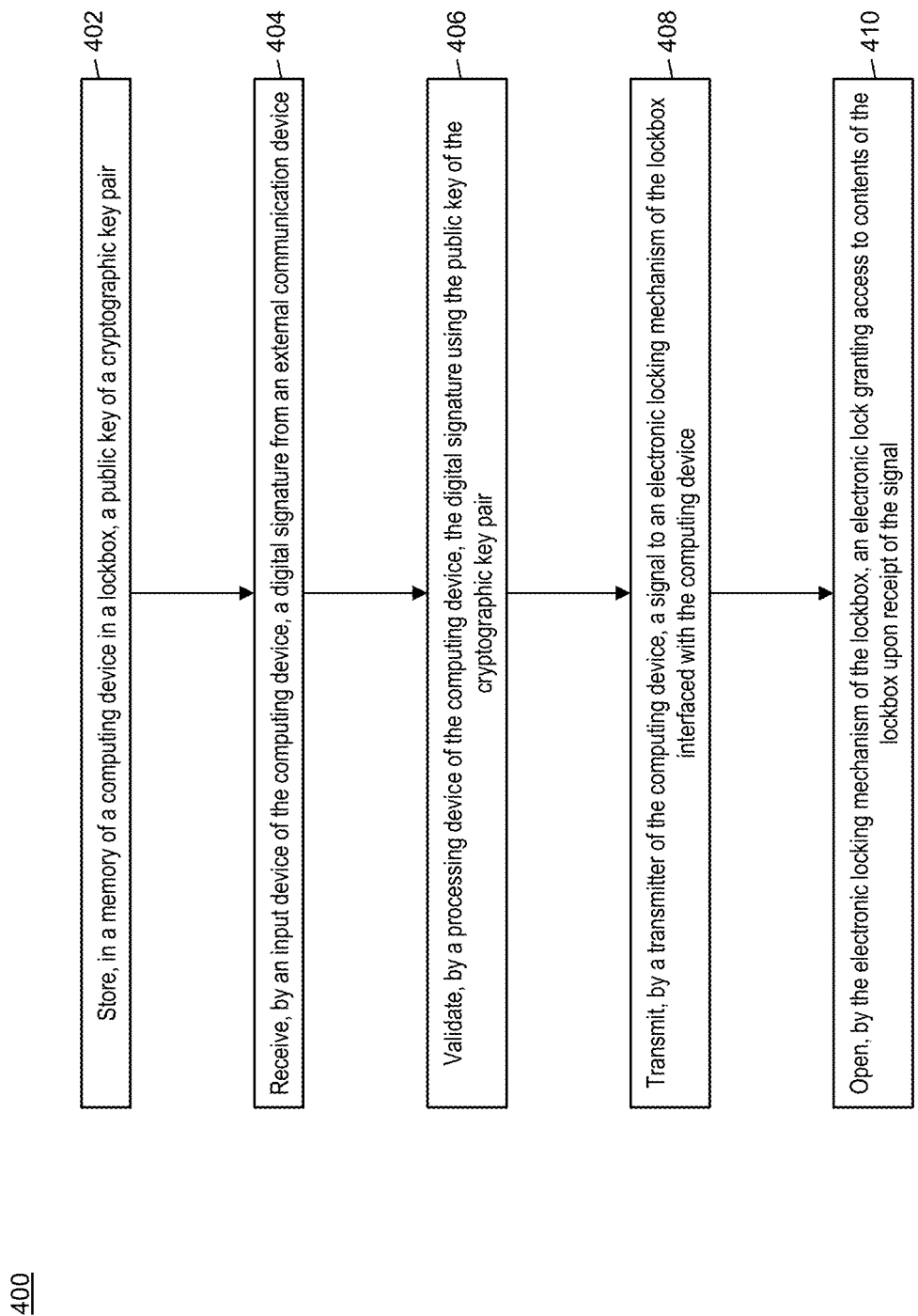
FIGS. 4 and 5 are flow charts illustrating exemplary methods for opening a secured lockbox through a digital signature in accordance with exemplary embodiments.

First Exemplary Method for Opening a Secured Lockbox Through a Digital Signature FIG. 4 illustrates a method 400 for the opening of a secured lockbox through the successful verification of a digital signature based on a public key stored in a memory of the lockbox.

In step 402, a public key of a cryptographic key pair may be stored in a memory (e.g., the memory 226) of a computing device in lockbox (e.g., the lockbox 102). In step 404, a digital signature may be received by an input device (e.g., the input device 206) of the computing device from an external communication device (e.g., the communication device 108). In step 406, the digital signature may be validated by a processing device (e.g., the validation module 220) of the computing device using the public key of the cryptographic key pair.

In step 408, a signal may be transmitted by a transmitter (e.g., the transmitting device 224, communication module 204, etc.) of the computing device to an electronic locking mechanism (e.g., the electronic locking mechanism 222) of the lockbox interfaced with the computing device. In step 410, an electronic lock may be opened by the electronic locking mechanism of the lockbox granting access to contents of the lockbox upon receipt of the signal.

In one embodiment, the digital signature may be generated by the external communication device using a private key of the cryptographic key pair. In some embodiments, the input device may be a receiver (e.g., the receiving device 202), and the digital signature may be received using near field communication. In one embodiment, the input device may be an optical imaging device, and the digital signature may be encoded from a machine-readable code displayed by the external communication device and read using the optical imaging device. In some embodiments, the digital signature may be stored in a blockchain data value in a blockchain associated with a blockchain network, and received from a node in the blockchain network.

Figure 5:
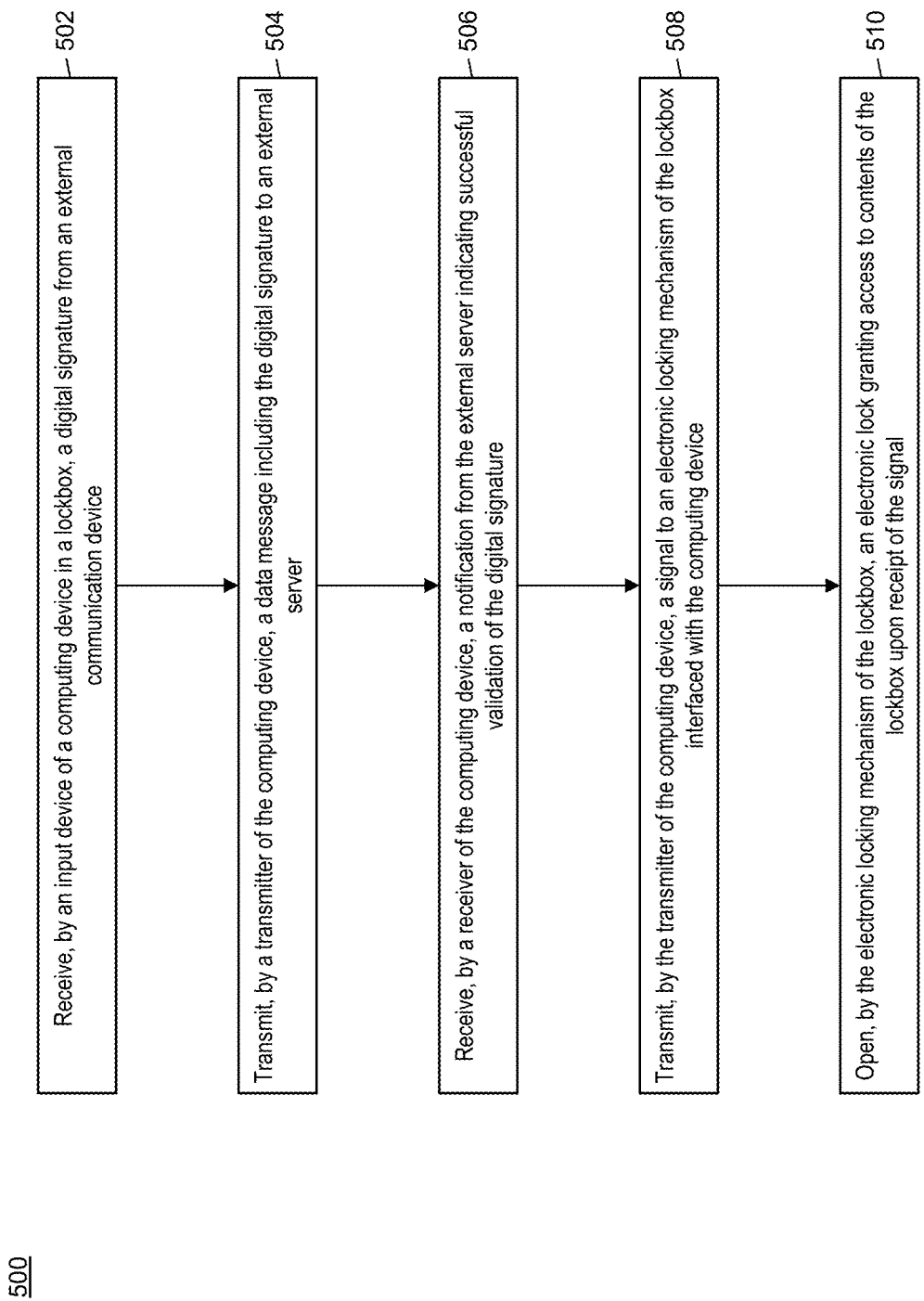

Second Exemplary Method for Opening a Secured Lockbox Through a Digital Signature FIG. 5 illustrates a method 500 for the opening of a secured lockbox through the successful verification of a digital signature by an external processing system on behalf of the lockbox.

In step 502, a digital signature may be received by an input device (e.g., the input device 206) of a computing device in a lockbox (e.g., the lockbox 102) from an external communication device (e.g., the communication device 108). In step 504, a data message including the digital signature may be transmitted by a transmitter (e.g., the transmitting device 224) of the computing device to an external server (e.g., the processing system 112). In step 506, a notification may be received by a receiver (e.g., the receiving device 202) of the lockbox from the external server indicating successful validation of the digital signature.

In step 508, a signal may be transmitted by a transmitter (e.g., the transmitting device 224, communication module 204, etc.) of the computing device to an electronic locking mechanism (e.g., the electronic locking mechanism 222) of the lockbox interfaced with the computing device. In step 510, an electronic lock may be opened by the electronic locking mechanism of the lockbox granting access to contents of the lockbox upon receipt of the signal.

In one embodiment, the digital signature may be generated by the external communication device using a private key of the cryptographic key pair. In some embodiments, the input device may be the receiver, and the digital signature may be received using near field communication. In one embodiment, the input device may be an optical imaging device, and the digital signature may be encoded from a machine-readable code displayed by the external communication device and read using the optical imaging device.

Computer System Architecture

Figure 6:
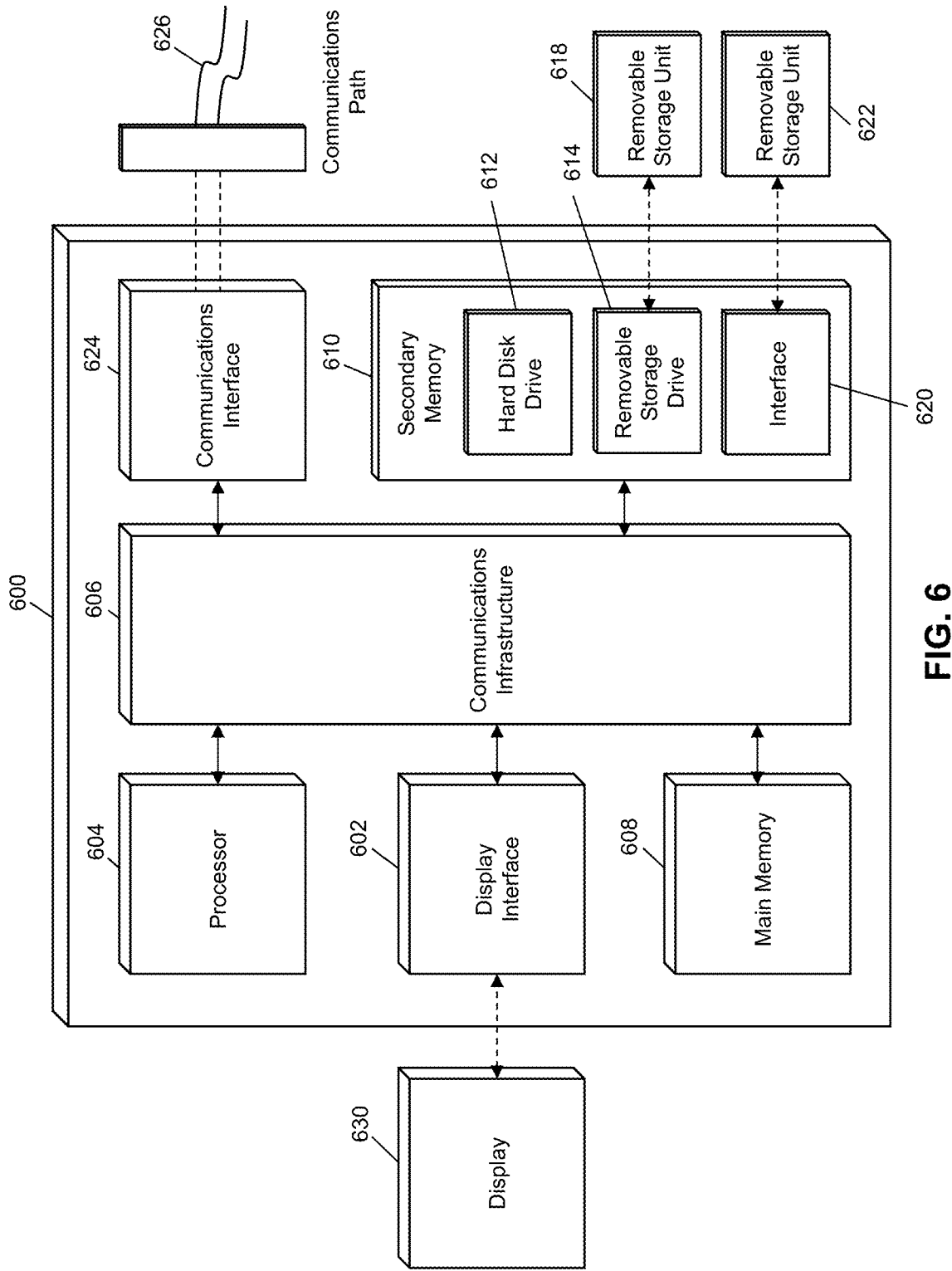
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the lockbox 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for opening a secured lockbox through a digital signature. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for opening a secured lockbox through a digital signature, comprising:
   storing, in a memory of a computing device in a lockbox, a public key of a cryptographic key pair received from an entity associated with a product, the public key provided to the entity associated with the product from an external communication device;
   receiving, by an input device of the computing device, a digital signature from the external communication device, wherein the digital signature is generated by the external communication device, as part of a purchasing process for the product by the external communication device, using a private key of the cryptographic key pair generated as part of the purchasing process, and wherein the storing of the public key and the receiving of the digital signature occur after completion of the purchasing process for the product;

validating, by a processing device of the computing device, the digital signature using the public key of the cryptographic key pair;
transmitting, by a transmitter of the computing device, a signal to an electronic locking mechanism of the lockbox interfaced with the computing device; and
opening, by the electronic locking mechanism of the lockbox, an electronic lock granting access to contents of the lockbox upon receipt of the signal.

2. The method of claim 1, wherein
the input device is a receiver, and
the digital signature is received using near field communication.

3. The method of claim 1, wherein
the input device is an optical imaging device, and
the digital signature is encoded from a machine-readable code displayed by the external communication device and read using the optical imaging device.

4. The method of claim 1, wherein the digital signature is received from a node in a blockchain network, the digital signature being included in a blockchain data value in a block included in a blockchain associated with the blockchain network, the digital signature having been transmitted to the blockchain network by the external communication device.

5. The method of claim 1, further comprising:
executing the purchasing process for the product on the external communication device.

6. The method of claim 1, further comprising:
executing the purchasing process for the product on the external communication device, and wherein purchasing process is through a website accessed by or via an application program executed by the external communication device.

7. A method for opening a secured lockbox through a digital signature, comprising:
receiving, by an input device of a computing device in a lockbox, a digital signature from an external communication device, wherein the digital signature is generated by the external communication device, as part of a purchasing process for a product by the external communication device, using a private key of a cryptographic key pair generated as part of the purchasing process, and wherein the receiving of the digital signature occurs after completion of the purchasing process for the product;
transmitting, by a transmitter of the computing device, a data message including the digital signature to an external server, the external server storing a public key of a cryptographic key pair received from an entity associated with the product, and wherein the public key is provided to the entity associated with the product from the external communication device;
receiving, by a receiver of the computing device, a notification from the external server indicating successful validation of the digital signature using the public key of the cryptographic key pair;
transmitting, by the transmitter of the computing device, a signal to an electronic locking mechanism of the lockbox interfaced with the computing device; and
opening, by the electronic locking mechanism of the lockbox, an electronic lock granting access to contents of the lockbox upon receipt of the signal.

8. The method of claim 7, wherein
the input device is the receiver, and
the digital signature is received using near field communication.

9. The method of claim 7, wherein
the input device is an optical imaging device, and
the digital signature is encoded from a machine-readable code displayed by the external communication device and read using the optical imaging device.

10. A system for opening a secured lockbox through a digital signature, comprising:
a lockbox configured to store contents, the lockbox including an electronic lock operated by an electronic locking mechanism and a computing device interfaced with the electronic locking mechanism, wherein
the computing device includes
a memory configured to store a public key of a cryptographic key pair received from an entity associated with a product, the public key provided to the entity associated with the product from an external communication device,
an input device configured to receive a digital signature from the external communication device, wherein the digital signature is generated by the external communication device, as part of a purchasing process for the product by the external communication device, using a private key of the cryptographic key pair generated as part of the purchasing process, and wherein the storing of the public key and the receiving of the digital signature occur after completion of the purchasing process for the product,
a processing device configured to validate the digital signature using the public key of the cryptographic key pair, and
a transmitter configured to transmit a signal to the electronic locking mechanism of the lockbox, and
the electronic locking mechanism of the lockbox is configured to open the electronic lock granting access to the contents of the lockbox upon receipt of the signal.

11. The system of claim 10, wherein
the input device is a receiver, and
the digital signature is received using near field communication.

12. The system of claim 10, wherein
the input device is an optical imaging device, and
the digital signature is encoded from a machine-readable code displayed by the external communication device and read using the optical imaging device.

13. The system of claim 10, wherein the digital signature is received from a node in a blockchain network, the digital signature being included in a blockchain data value in a block included in a blockchain associated with the blockchain network, the digital signature having been transmitted to the blockchain network by the external communication device.

14. A system for opening a secured lockbox through a digital signature, comprising:
a lockbox configured to store contents, the lockbox including an electronic lock operated by an electronic locking mechanism and a computing device interfaced with the electronic locking mechanism, wherein
the computing device includes
an input device of the computing device configured to receive a digital signature from an external communication device,
a transmitter configured to transmit a data message including the digital signature to an external server, the external server storing a public key of a cryptographic key pair received from an entity associated with a product, the public key provided to the entity associated with the product from the external communication device, and wherein the digital signature is generated by the external communication device, as part of a purchasing process for the product by the external communication device, using a private key of a cryptographic key pair generated as part of the purchasing process, and wherein the receiving of the digital signature occurs after completion of the purchasing process for the product, and a receiver configured to receive a notification from the external server indicating successful validation of the digital signature using the public key of the cryptographic key pair, wherein the transmitter is further configured to transmit a signal to an electronic locking mechanism of the lockbox interfaced with the computing device, and the electronic locking mechanism of the lockbox is configured to open the electronic lock granting access to the contents of the lockbox upon receipt of the signal.

15. The system of claim 14, wherein the input device is the receiver, and the digital signature is received using near field communication.

16. The system of claim 14, wherein the input device is an optical imaging device, and the digital signature is encoded from a machine-readable code displayed by the external communication device and read using the optical imaging device.

* * * * *